United States Patent
Nagahara

(10) Patent No.: US 6,809,877 B2
(45) Date of Patent: Oct. 26, 2004

(54) ZOOM LENS AND PROJECTION DISPLAY DEVICE USING THE SAME

(75) Inventor: Akiko Nagahara, Koshigaya (JP)

(73) Assignee: Fuji Photo Optical Co., Ltd., Saitama (JP)

( * ) Notice: Subject to any disclaimer, the term of this patent is extended or adjusted under 35 U.S.C. 154(b) by 0 days.

(21) Appl. No.: 10/459,520

(22) Filed: Jun. 12, 2003

(65) Prior Publication Data

US 2003/0231404 A1 Dec. 18, 2003

(30) Foreign Application Priority Data

Jun. 14, 2002  (JP) ........................................ 2002-173664

(51) Int. Cl.⁷ .............................................. G02B 15/14
(52) U.S. Cl. ..................................... 359/676; 359/683
(58) Field of Search ............................... 359/676, 683, 359/663, 649

(56) References Cited

U.S. PATENT DOCUMENTS 6,633,436 B2 * 10/2003 Wada et al. ................ 359/681
6,639,737 B2 * 10/2003 Yasui et al. ................. 359/761

FOREIGN PATENT DOCUMENTS

| JP | 10-268193 | 10/1998 |
|----|-----------|---------|
| JP | 2000-292701 | 10/2000 |
| JP | 2001-4919 | 1/2001 |

* cited by examiner

Primary Examiner—Jordan M. Schwartz
(74) Attorney, Agent, or Firm—Arnold International; Jon W. Henry; Bruce Y. Arnold

(57) ABSTRACT

A zoom lens includes, in order from the enlarging side: a first lens group that has negative refractive power, is movable for focusing, and is stationary during zooming; second, third, and fourth lens groups that are movable for zooming; and a fifth lens group that is stationary during zooming. The second, third, fourth, and fifth lens groups have positive refractive powers. The second, third, and fourth lens groups move nearer the enlarging side when the zoom lens zooms toward the telephoto end. The ratios of the focal lengths of the first, first through third, fourth, and fifth lens groups to the focal length of the zoom lens satisfy four conditions. The fourth lens group is a biconvex lens element. A projection display device uses the zoom lens.

24 Claims, 6 Drawing Sheets

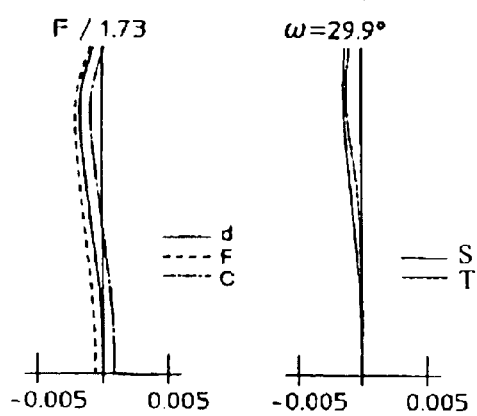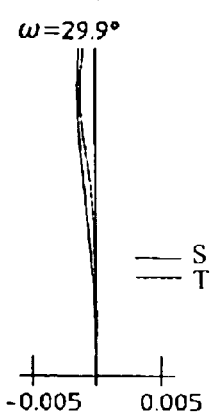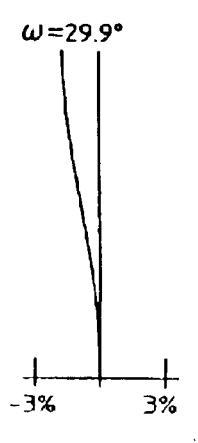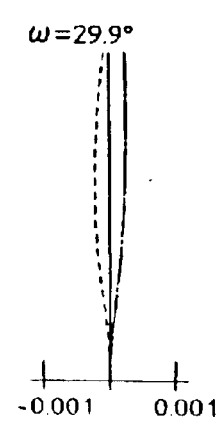
Fig. 3A    Fig. 3B    Fig. 3C    Fig. 3D
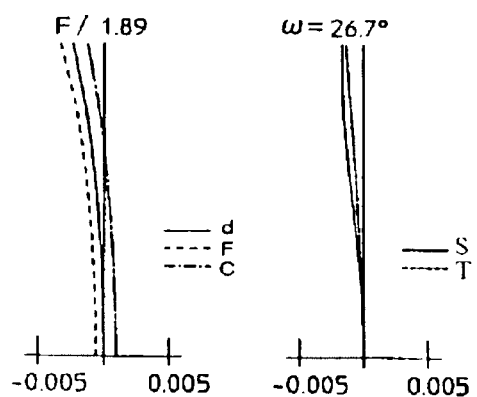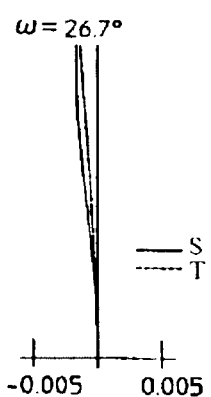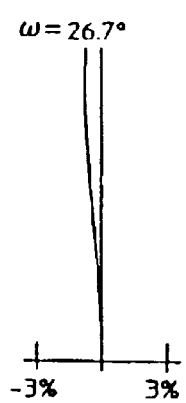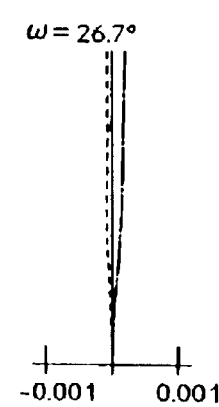
Fig. 3E    Fig. 3F    Fig. 3G    Fig. 3H
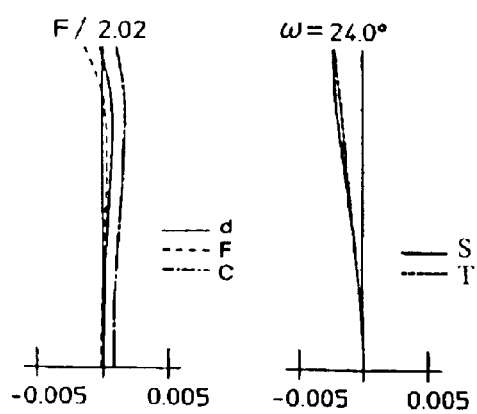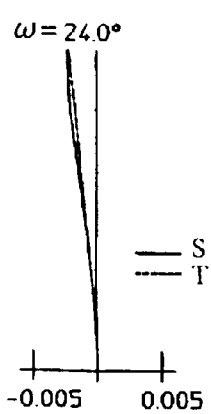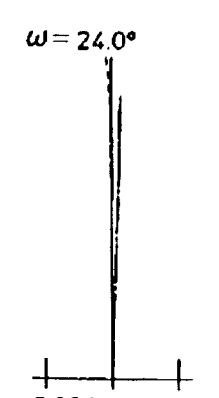
Fig. 3I    Fig. 3J    Fig. 3K    Fig. 3L

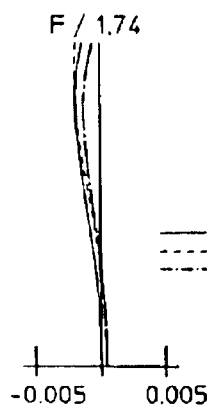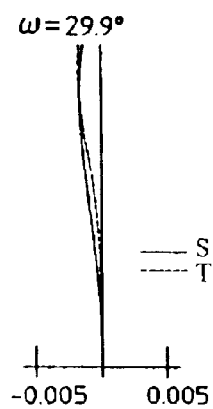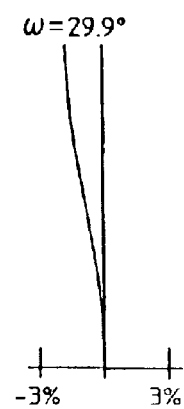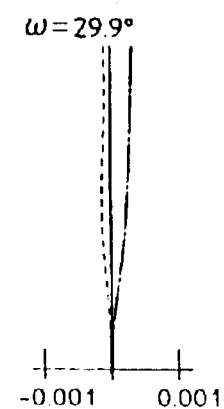
Fig. 5A    Fig. 5B    Fig. 5C    Fig. 5D
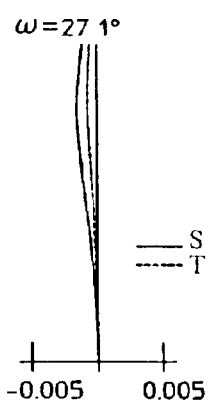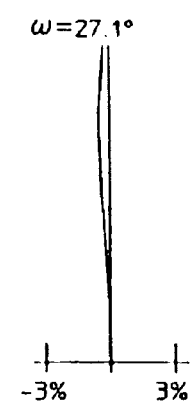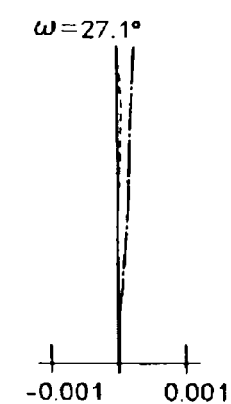
Fig. 5E    Fig. 5F    Fig. 5G    Fig. 5H
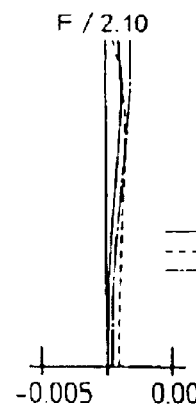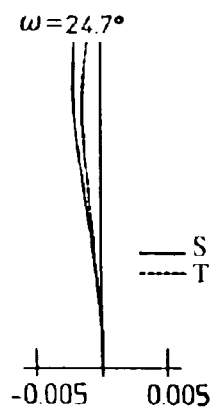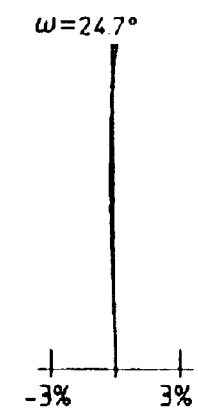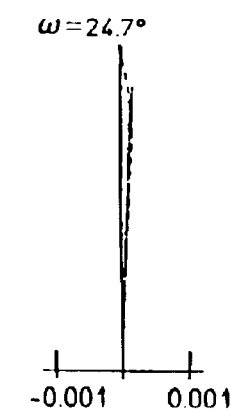
Fig. 5I    Fig. 5J    Fig. 5K    Fig. 5L

ZOOM LENS AND PROJECTION DISPLAY DEVICE USING THE SAME

BACKGROUND OF THE INVENTION

Zoom lenses of a five-group construction are known. For example, Japanese Laid-Open Patent Application H10-268193, Japanese Laid-Open Patent Application 2000-292701, and Japanese Laid-Open Patent Application 2001-004919 disclose zoom lenses that include, in order from the enlarging side, a first lens group having negative refractive power and a focusing function and that is stationary during zooming, a second lens group having positive refractive power, a third lens group having positive refractive power, a fourth lens group having negative refractive power, with the second, third, and fourth lens groups being movable for zooming, and a fifth lens group having positive refractive power that is fixed during zooming.

There has been a demand for a zoom lens of the type described in these Japanese published applications that provides a bright image even with a liquid crystal image source in a projection display device and that has the compactness desired in a projection display device. In addition, recently there has been a demand for projection to a large screen at a close distance by using a projection lens with an even wider field angle. Moreover, a larger zoom ratio has been desired.

Furthermore, it is desirable that the zoom lens be at least nearly telecentric on the reducing side and include a large enough back focus distance to provide room for a color synthesizing optical system in a projection display device or, similarly, a color separation optical system when the zoom lens is used in a camera.

However, the brightness of a zoom lens is determined by limitations of movement of lens groups close to the aperture stop. Accordingly, the zoom lenses have been designed so that the amount of movement of moving lens groups close to the aperture stop does not increase too much in order to obtain a large zoom ratio without impairing the brightness at the telephoto end of the zoom lenses, as set forth in the Japanese published applications listed above. This requirement has become a primary factor constraining the degrees of freedom in the lens design of the zoom lenses.

BRIEF SUMMARY OF THE INVENTION

The present invention relates to a zoom lens that includes five lens groups, three of which move for zooming, that allows the degrees of freedom in design to achieve a bright image, with a large zoom ratio and with a large amount of movement of lens groups close to the aperture stop, and that favorably corrects aberrations. Moreover, the present invention relates to a projection display device, such as a projection-type television, using such a zoom lens with, for example, a liquid crystal image source, and to a camera using an image pickup element, such as a CCD, an image pickup tube, photographic film, or similar devices, that uses such a zoom lens.

BRIEF DESCRIPTION OF THE DRAWINGS

The present invention will become more fully understood from the detailed description given below and the accompanying drawings, which are given by way of illustration only and thus are not limitative of the present invention, wherein:

FIGS. 3A–3D show aberrations of the zoom lens of Embodiment 1 at the wide-angle end;

FIGS. 3E–3H show aberrations of the zoom lens of Embodiment 1 at an intermediate position;

FIGS. 3I–3L show aberrations of the zoom lens of Embodiment 1 at the telephoto end;

FIGS. 5A–5D show aberrations of the zoom lens of Embodiment 3 at the wide-angle end;

FIGS. 5E–5H show aberrations of the zoom lens of Embodiment 3 at an intermediate position;

FIGS. 5I–5L show aberrations of the zoom lens of Embodiment 3 at the telephoto end.

DETAILED DESCRIPTION

First, definitions of the terms "lens element," "lens component," and "lens group," that relate to the following detailed description will be given. The term "lens element" is herein defined as a single transparent mass of refractive material having two opposed refracting surfaces, which surfaces are positioned at least generally transversely of the optical axis of the zoom lens. The term "lens component" is herein defined as (a) a single lens element spaced so far from any adjacent lens element that the spacing cannot be neglected in computing the optical image forming properties of the lens elements or (b) two or more lens elements that have their adjacent lens surfaces either in full overall contact or overall so close together that the spacings between adjacent lens surfaces of the different lens elements are so small that the spacings can be neglected in computing the optical image forming properties of the two or more lens elements. Thus some lens elements may also be lens components. Therefore, the terms "lens element" and "lens component" should not be taken as mutually exclusive terms. In fact, the terms may be used to describe a single lens element in accordance with part (a) above of the definition of a "lens component."

The term "lens group" is herein defined as a group of one or more lens components in optical series along an optical axis that, for known purposes of lens evaluation and lens design, may be considered equivalent to a single lens element. Known lens design and evaluation techniques determine whether a group of one or more lens components in optical series is properly considered a lens group. As more precise lens evaluation and lens design techniques are considered, a lens group that includes more than one lens component may be divided into further lens groups, and that process of division may proceed, in some cases, until a lens group that includes only one lens component is identified.

Additionally, as used herein, the term "negative" preceding a lens element, lens component, or lens group means that the lens element, lens component, or lens group (as a whole) has a negative refractive power. Similarly, as used herein, the term "positive" preceding a lens element, lens component, or lens group means that the lens element, lens component, or lens group (as a whole) has a positive refractive power.

Figure 1:
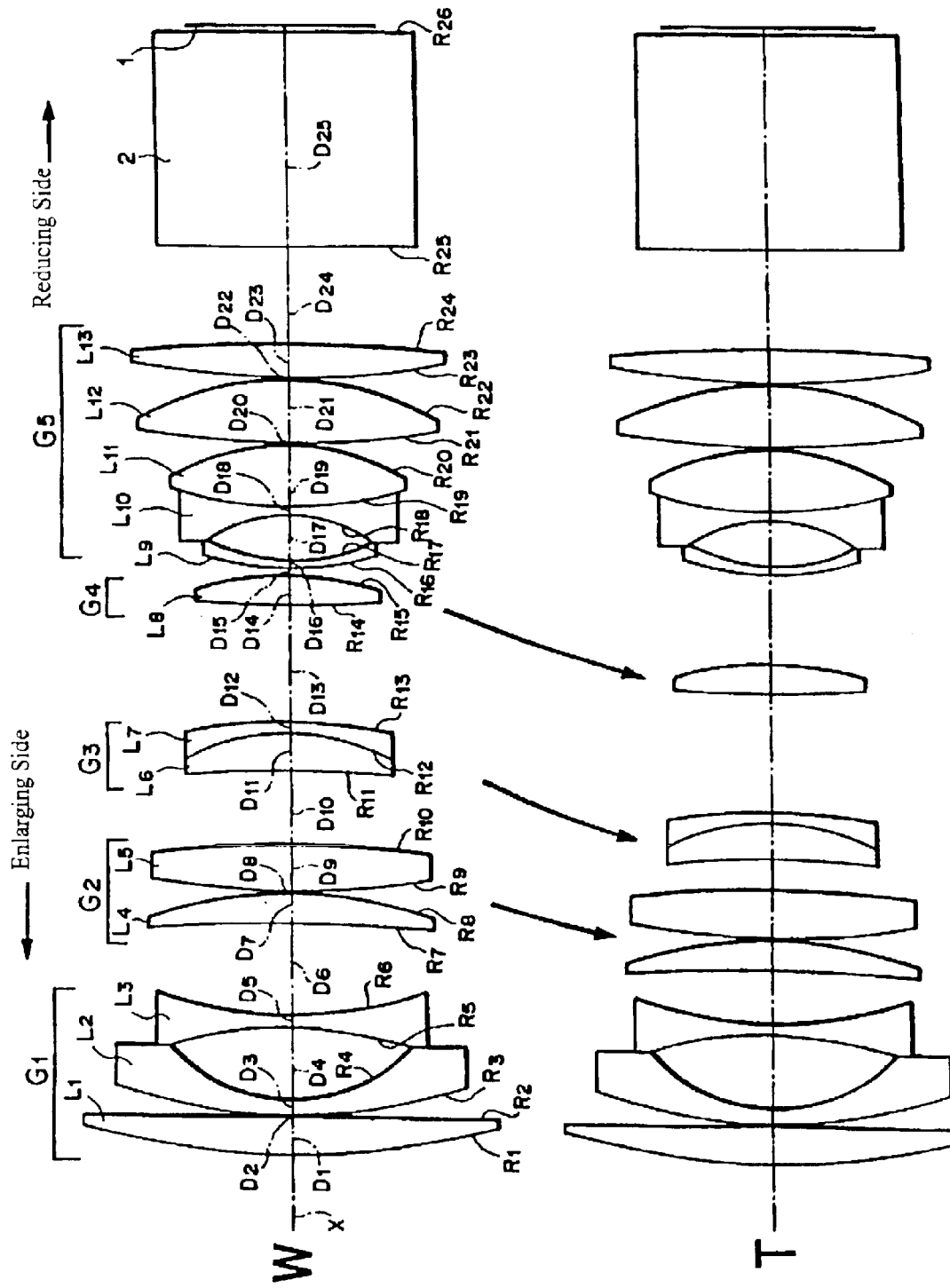
FIG. 1 shows cross-sectional views of the zoom lens of Embodiment 1 at the wide-angle end W and the telephoto end T.
Figure 2:
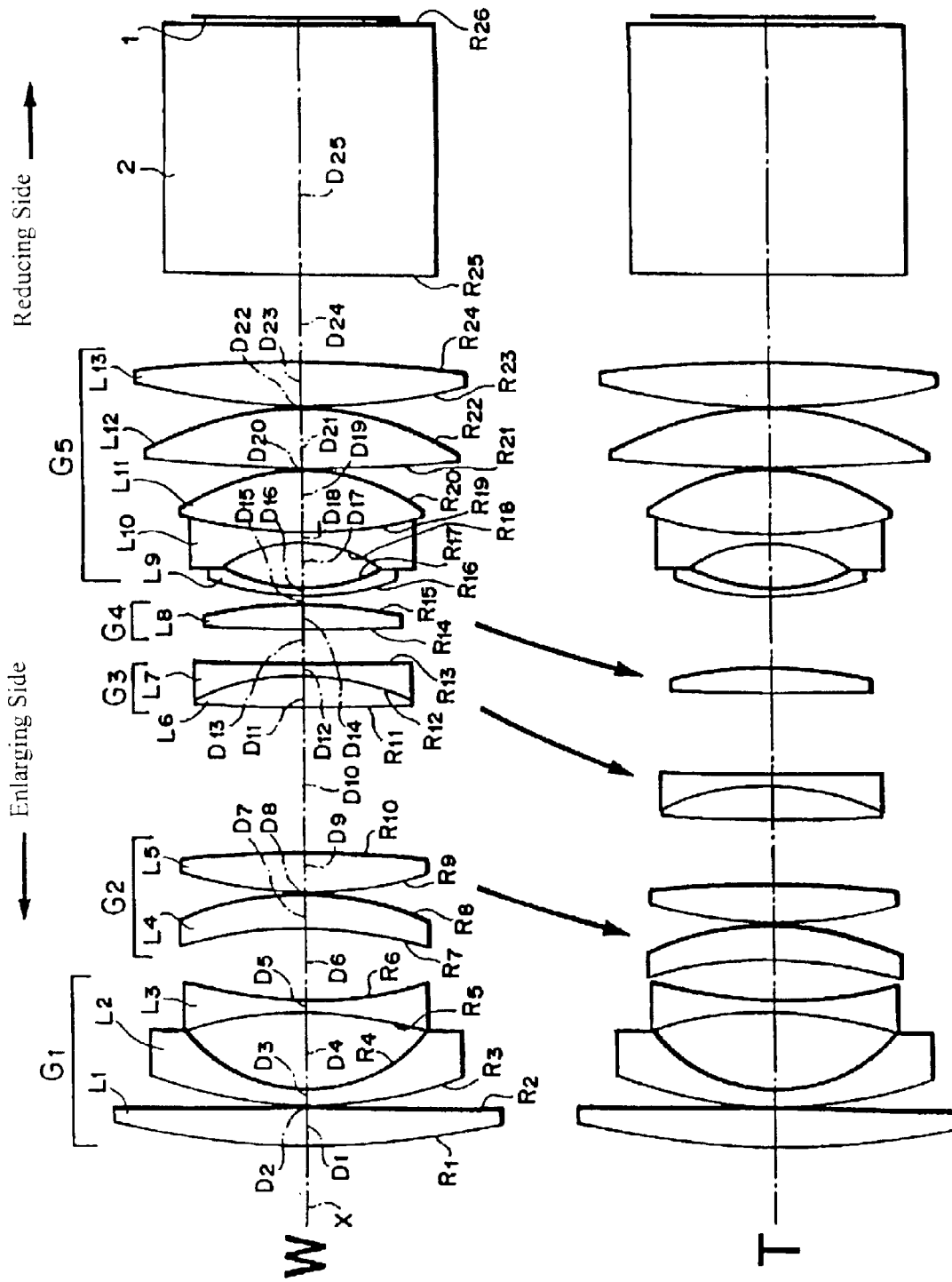
FIG. 2 shows cross-sectional views of the zoom lens of Embodiment 3 at the wide-angle end W and the telephoto end T.

A general description of the preferred embodiments of the zoom lens of the present invention will now be described with reference to FIG. 1 that shows Embodiment 1. In FIG. 1, lens groups are referenced by the letter G followed by a number denoting their order from the enlarging side of the zoom lens, from $G_1$ to $G_5$, along the optical axis X. Lens elements are referenced by the letter L followed by a number denoting their order from the enlarging side of the zoom lens, from $L_1$ to $L_{13}$ for Embodiments 1–3 that follow. In Embodiments 1–3, as shown in FIGS. 1 and 2, an upper left arrow points toward the enlarging side and an upper right arrow points toward the reducing side. In FIGS. 1 and 2, reference numeral 2 denotes a color synthesizing optical system, such as a color synthesizing prism, as well as an infrared cutoff filter or a low-pass filter that may be present (when the zoom lens would be used in a camera, reference numeral 2 would relate to a color separating optical system). Reference numeral 1 denotes a liquid crystal display panel that serves as an image source. Radii of curvature of the optical surfaces of all the optical elements are referenced by the letter R followed by a number denoting their order from the enlarging side of the zoom lens, from $R_1$ to $R_{26}$ for Embodiments 1–3 that follow. The on-axis surface spacings along the optical axis X of all the optical element surfaces are referenced by the letter D followed by a number denoting their order from the enlarging side of the zoom lens, from $D_1$ to $D_{25}$ for Embodiments 1–3 that follow. The top parts of FIGS. 1 and 2 show the positions of the five lens groups at the wide-angle end, indicated by the letter "W," and the bottom parts of the FIGS. 1 and 2 show the positions of the five lens groups at the telephoto end, indicated by the letter "T."

A general description of the preferred embodiments of the zoom lens of the present invention will now be further described with regard to features common to Embodiments 1–3 of the present invention with particular reference to FIG. 1 that shows Embodiment 1. As shown in FIG. 1, a zoom lens according to the present invention includes, in order from the enlarging side, a first lens group $G_1$ having negative refractive power for focusing and that is stationary at the time of zooming, a second lens group $G_2$ having positive refractive power, a third lens group $G_3$ having positive refractive power, a fourth lens group $G_4$ having positive refractive power, and a fifth lens group $G_5$ having positive refractive power that operates as a relay lens. Lens groups $G_2$, $G_3$, and $G_4$ move continuously toward the enlarging side during zooming from the wide-angle end to the telephoto end in order to provide zooming and adjustment of the image plane due to zooming. Preferably, the fourth lens group $G_4$ is formed of a biconvex lens element (lens element L, as shown in FIGS. 1 and 2).

Preferably, the following condition is satisfied:

$$0.8<|F1|/F<1.2 \qquad \text{Condition (1)}$$

where

F1 is the focal length of the first lens group $G_1$, and

F is the focal length of the zoom lens at the wide-angle end when the zoom lens is focused at infinity on the enlarging side.

Also, the following condition is preferably satisfied:

$$1.3<F5/F<2.3 \qquad \text{Condition (2)}$$

where

F5 is the focal length of the fifth lens group $G_5$, and

F is as defined above.

Additionally, the following condition is preferably satisfied:

$$2.0<F(1-3)/F \qquad \text{Condition (3)}$$

where

F(1–3) is the composite focal length of first lens group $G_1$, the second lens group $G_2$, and the third lens group $G_3$ at the wide-angle end when the zoom lens is focused at infinity on the enlarging side, F is as defined above.

Furthermore, preferably the following condition is satisfied:

$$2.5<F4/F<5.5 \qquad \text{Condition (4)}$$

where

F4 is the focal length of the fourth lens group $G_4$, and

F is as defined above.

As explained above, a zoom lens of the present invention includes, in order from the enlarging side, a second lens group $G_2$ having positive refractive power, a third lens group $G_3$ having positive refractive power, and a fourth lens group $G_4$ having positive refractive power, and these lens groups move continuously toward the enlarging side during zooming from the wide-angle end to the telephoto end in order to provide zooming and adjustment of the image plane due to zooming. The brightness of the zoom lens is determined by the limitations of light passing through the aperture stop that is affected by the positions of the moving lens groups close to the aperture stop. In order to obtain a large zoom ratio without impairing the brightness at the telephoto end, the amount of movement of the third lens group $G_3$ must not be increased too much in the lens design of a zoom lens of the present invention that uses three moving lens groups because that would excessively constrain other degrees of freedom in the lens design. However, if the angle made by an axial ray and the optical axis immediately after the third lens group $G_3$ is small, the influence of movement of the third lens group $G_3$ on the brightness at the telephoto end is reduced. This angle reduction can be achieved by decreasing the composite focal length of the first lens group $G_1$ through the third lens group $G_3$, which is related to Condition (3). Satisfying Condition (3) enables a lens design that decreases the angle made by an axial ray and the optical axis immediately after the third lens $G_3$ that, in turn, enables a large zoom ratio without unduly limiting degrees of freedom of lens design and without impairing brightness at the telephoto end.

If the fourth lens group $G_4$ has a negative focal length, the fifth lens group $G_5$ tends to have too much positive refractive power for favorable correction of aberrations. To avoid this, in the zoom lens of the present invention, the fourth lens group $G_4$ has a positive focal length.

Additionally, if the ratio of focal lengths of Condition (4) is less than the lower limit of Condition (4), the amount of aberrations tends to increase so that correction of the aberrations becomes difficult. On the other hand, if the ratio of focal lengths of Condition (4) is larger than the upper limit of Condition (4), the amount of movement of the moving lens groups at the time of zooming tends to become so large that making the zoom lens compact is difficult.

Furthermore, in the zoom lens of the present invention, the fourth lens group $G_4$ includes a biconvex lens element that may have relatively weak refractive power and that may be the only lens component in the fourth lens group $G_4$, which assists in correcting aberrations.

The zoom lens of the present invention is constructed so that all the moving lens groups move in the same direction when zooming from the wide-angle end to the telephoto end, as shown by the movement loci, indicated by arrows, of the moving lens groups in FIGS. 1 and 2. This arrangement enables effective use of the moving spaces of the lens groups to provide compactness of the zoom lens. The three lens groups $G_2$, $G_3$, and $G_4$ are all nearer the enlarging side at the telephoto end than at the wide-angle end of the zooming range and the lens groups move relative to one another along the optical axis during zooming.

With regard to Condition (1), if the ratio of focal lengths of Condition (1) is larger than the upper limit of Condition (1), aberration correction of a zoom lens with a small F No. becomes difficult, variations in aberrations associated with movement of the first lens group $G_1$ become excessive, and the amount of movement of the first lens group $G_1$ required for focusing increases. If the ratio of focal lengths of Condition (1) is less than the lower limit of Condition (1), axial light rays are spread too far from the optical axis X by the first lens group $G_1$ so that particularly the correction of distortion aberration and spherical aberration becomes difficult.

With regard to Condition (2), if the ratio of focal lengths of Condition (2) is less than the lower limit of Condition (2), the back focus distance becomes small and it becomes difficult to obtain a telecentric or nearly telecentric condition on the reducing side. A relatively large back focus distance is necessary in order to provide room for a color synthesizing optical system in a projection display device (or similarly, a color separation optical system in a camera, such as a dichroic prism), represented as a glass block 2 in FIGS. 1 and 2. On the other hand, if the ratio of focal lengths of Condition (2) is greater than the upper limit of Condition (2), the back focus distance tends to increase too much, which in turn, tends to make the zoom lens less compact. Additionally, the height of axial light rays at the fifth lens group $G_5$ decreases so much that correction of aberrations becomes difficult.

Embodiments 1–3 of the present invention will now be individually described with reference to the drawings.

Embodiment 1

FIG. 1 shows the basic lens element configuration of the five-group zoom lens of Embodiment 1. In Embodiment 1, the first lens group in order from the enlarging side, $G_1$, includes, in order from the enlarging side, a first lens element $L_1$ that is a biconvex lens element with its lens surface of greater curvature on the enlarging side, a second lens element $L_2$ that is a meniscus lens element having negative refractive power and with its convex lens surface on the enlarging side, and a third lens element $L_3$ that is a biconcave lens element. The second lens group in order from the enlarging side, $G_2$, includes, in order from the enlarging side, a fourth lens element $L_4$ that is a meniscus lens element having positive refractive power and with its convex lens surface on the reducing side and a fifth lens element $L_5$ that is a biconvex lens element with its lens surface of greater curvature on the enlarging side. The third lens group in order from the enlarging side, $G_3$, includes a lens component formed of a sixth lens element $L_6$ that is a meniscus lens element having positive refractive power and with its convex lens surface on the reducing side and a seventh lens element $L_7$ that is a meniscus lens element having negative refractive power with its convex lens surface on the reducing side and that is cemented to the sixth lens element $L_6$. The fourth lens group in order from the enlarging side, $G_4$, includes an eighth lens element $L_8$ that is a biconvex lens element with its lens surface of greater curvature on the reducing side. The fifth lens group in order from the enlarging side, $G_5$, includes, in order from the enlarging side, a ninth lens element $L_9$ that is a meniscus lens element having negative refractive power and its convex lens surface on the enlarging side, a lens component formed of a tenth lens element $L_{10}$ that is a biconcave lens element with its lens surface of greater curvature on the enlarging side and an eleventh lens element $L_{11}$ that is a biconvex lens element with its lens surface of greater curvature on the reducing side and that is cemented to the tenth lens element $L_{10}$, a twelfth lens element $L_{12}$ that is a biconvex lens element with its lens surface of greater curvature on the reducing side, and a thirteenth lens element $L_{13}$ that is a biconvex lens element with its lens surface of greater curvature on the enlarging side.

Table 1 below lists the surface number #, in order from the enlarging side, the radius of curvature R of each surface, the on-axis surface spacing D, as well as the refractive index $N_d$ and the Abbe number $v_d$ (at the d-line) of each lens element for Embodiment 1. The numerical values of R and D are based on a normalized focal length of 1 at the wide-angle end of the zoom lens of Embodiment 1 with the zoom lens focused at infinity. The zoom lens of Embodiment 1 provides a reducing magnification of –0.01 18 at the image reducing side at the wide-angle end of the zoom lens.

TABLE 1

| # | R | D | $N_d$ | $v_d$ |
| --- | --- | --- | --- | --- |
| 1 | 3.870 | 0.230 | 1.77250 | 49.6 |
| 2 | –194.005 | 0.007 | | |
| 3 | 2.816 | 0.082 | 1.49700 | 81.5 |
| 4 | 0.831 | 0.449 | | |
| 5 | –1.960 | 0.063 | 1.80518 | 25.4 |
| 6 | 2.113 | $D_6$(variable) | | |
| 7 | –8.948 | 0.181 | 1.83400 | 37.2 |
| 8 | –2.055 | 0.007 | | |
| 9 | 4.377 | 0.288 | 1.80518 | 25.4 |
| 10 | –5.214 | $D_{10}$(variable) | | |
| 11 | –5.406 | 0.221 | 1.56384 | 60.7 |
| 12 | –1.111 | 0.061 | 1.51742 | 52.4 |
| 13 | –3.004 | $D_{13}$(variable) | | |
| 14 | 9.745 | 0.170 | 1.48749 | 70.2 |
| 15 | –1.733 | $D_{15}$(variable) | | |
| 16 | 1.499 | 0.043 | 1.54814 | 45.8 |
| 17 | 0.902 | 0.270 | | |
| 18 | –0.764 | 0.054 | 1.80518 | 25.4 |
| 19 | 1.919 | 0.379 | 1.61800 | 63.4 |
| 20 | –1.175 | 0.009 | | |
| 21 | 4.782 | 0.377 | 1.61800 | 63.4 |
| 22 | –1.605 | 0.009 | | |
| 23 | 4.237 | 0.203 | 1.80518 | 25.4 |
| 24 | –9.346 | 0.570 | | |
| 25 | ∞ | 1.297 | 1.51680 | 64.2 |
| 26 | ∞ | | | |

In the zoom lens of Embodiment 1, lens groups $G_2$, $G_3$, and $G_4$ move to vary the separations of the five lens groups during zooming. Therefore, the values of the on-axis spacings $D_6$, $D_{10}$, $D_{13}$ and $D_{15}$ vary.

Table 2 below lists the values of the variables $D_6$, $D_{10}$, $D_{13}$, and $D_{15}$ (i.e., the group spacings) at zoom ratios of 1.00, 1.13, and 1.27.

TABLE 2

| Zoom ratio | $D_6$ | $D_{10}$ | $D_{13}$ | $D_{15}$ |
|---|---|---|---|---|
| 1.00 | 0.538 | 0.453 | 0.711 | 0.037 |
| 1.13 | 0.419 | 0.223 | 0.841 | 0.256 |
| 1.27 | 0.310 | 0.169 | 0.726 | 0.535 |

As set forth in Table 3 below, the zoom lens of Embodiment 1 of the present invention satisfies all of Conditions (1) through (4) above.

TABLE 3

| Condition No. | Condition | Value |
|---|---|---|
| (1) | $0.8 < |F1|/F < 1.2$ | 0.974 |
| (2) | $1.3 < F5/F < 2.3$ | 1.939 |
| (3) | $2.0 < F(1-3)/F$ | 5.584 |
| (4) | $2.5 < F4/F < 5.5$ | 3.033 |

FIGS. 3A–3D show the spherical aberration, astigmatism, distortion, and lateral color, respectively, of the zoom lens of Embodiment 1 at the wide-angle end with a zoom ratio of 1.0. FIGS. 3E–3H show the spherical aberration, astigmatism, distortion, and lateral color, respectively, of the zoom lens of Embodiment 1 at an intermediate position with a zoom ratio of 1.13, and FIGS. 3I–3L show the spherical aberration, astigmatism, distortion, and lateral color, respectively, of the zoom lens of Embodiment 1 at the telephoto end with a zoom ratio of 1.27. In FIGS. 3A, 3E, and 3I, the spherical aberration is shown for the wavelengths 587.6 nm (the d-line), 486.1 nm (the F-line), and 656.3 nm (the C-line). In the remaining figures, ω is the half-image angle. In FIGS. 3B, 3F and 3J, the astigmatism is shown for both the sagittal image surface S and the tangential image surface T. In FIGS. 3C, 3G and 3K, distortion is measured at 587.6 nm (the d-line). In FIGS. 3D, 3H and 3L, the lateral color is shown for the wavelengths 486.1 nm (the F-line) and 656.3 nm (the C-line) relative to 587.6 nm (the d-line). As is apparent from these figures, the various aberrations are favorably corrected.

As is apparent from FIGS. 3A–3L, as well as in Tables 1–3, the zoom lens according to Embodiment 1 provides satisfactory aberration correction over the entire zoom range, includes a suitable back focus distance, is nearly telecentric on the reducing side, and also provides a desirable balance of features of image brightness, compactness, width of the angle of view, and zoom ratio.

Embodiment 2

FIG. 1 shows the basic lens element configuration of the zoom lens of Embodiment 2. Embodiment 2 is similar to Embodiment 1 in that lens groups $G_1$ and $G_5$ remain stationary while lens groups $G_2$, $G_3$, and $G_4$ move during zooming adjustment. Embodiment 2 differs from Embodiment 1 in its lens elements configuration by different radii of curvature of lens surfaces, different optical element surface spacings, and some different indexes of refraction of the lens element materials. Additionally, Embodiment 2 differs from Embodiment 1 in that the first lens element $L_1$ is a meniscus lens having positive refractive power with its convex lens surface on the enlarging side rather than a biconvex lens element as in Embodiment 1. Although the curvature radii of the reducing side lens surface of lens element $L_1$ in Embodiments 1 and 2 are of opposite sign, the radii are both relatively large and therefore are well represented as an almost flat lens surface as shown in FIG. 1.

Table 4 below lists the surface number #, in order from the enlarging side, the radius of curvature R of each surface, the on-axis surface spacing D, as well as the refractive index $N_d$ and the Abbe number $v_d$ (at the d-line) of each lens element for Embodiment 2. The numerical values of R and D are based on a normalized focal length of 1 at the wide-angle end configuration of the zoom lens of Embodiment 2 with the zoom lens focused at infinity. The zoom lens of Embodiment 2 provides a reducing magnification of –0.0118 at the image reducing side at the wide-angle end of the zoom lens.

TABLE 4

| # | R | D | $N_d$ | $v_d$ |
|---|---|---|---|---|
| 1 | 3.801 | 0.212 | 1.77250 | 49.6 |
| 2 | 29.625 | 0.007 | | |
| 3 | 1.967 | 0.082 | 1.71300 | 53.9 |
| 4 | 0.883 | 0.448 | | |
| 5 | –2.100 | 0.063 | 1.80518 | 25.4 |
| 6 | 2.287 | $D_6$(variable) | | |
| 7 | –6.162 | 0.181 | 1.80400 | 46.6 |
| 8 | –1.962 | 0.007 | | |
| 9 | 2.991 | 0.206 | 1.80518 | 25.4 |
| 10 | –8.407 | $D_{10}$(variable) | | |
| 11 | –4.169 | 0.246 | 1.51633 | 64.1 |
| 12 | –0.848 | 0.061 | 1.51742 | 52.4 |
| 13 | –2.263 | $D_{13}$(variable) | | |
| 14 | 20.331 | 0.145 | 1.48749 | 70.2 |
| 15 | –2.318 | $D_{15}$(variable) | | |
| 16 | 2.285 | 0.043 | 1.58144 | 40.8 |
| 17 | 1.137 | 0.256 | | |
| 18 | –0.812 | 0.054 | 1.80518 | 25.4 |
| 19 | 2.354 | 0.351 | 1.61800 | 63.4 |
| 20 | –1.231 | 0.009 | | |
| 21 | 8.077 | 0.326 | 1.60311 | 60.6 |
| 22 | –1.645 | 0.009 | | |
| 23 | 2.907 | 0.238 | 1.83400 | 37.2 |
| 24 | –10.227 | 0.570 | | |
| 25 | ∞ | 1.298 | 1.51680 | 64.2 |
| 26 | ∞ | | | |

In the zoom lens of Embodiment 2, lens groups $G_2$, $G_3$, and $G_4$ move to vary the separations of the five lens groups during zooming. Therefore, the values of the on-axis spacings $D_6$, $D_{10}$, $D_{13}$ and $D_{15}$ vary.

Table 5 below lists the values of the variables $D_6$, $D_{10}$, $D_{13}$, and $D_{15}$ (i.e., the group spacings) at zoom ratios of 1.00, 1.20, and 1.25.

TABLE 5

| Zoom ratio | $D_6$ | $D_{10}$ | $D_{13}$ | $D_{15}$ |
|---|---|---|---|---|
| 1.00 | 0.651 | 0.457 | 0.824 | 0.037 |
| 1.20 | 0.457 | 0.308 | 0.646 | 0.557 |
| 1.25 | 0.417 | 0.339 | 0.510 | 0.702 |

As set forth in Table 6 below, the zoom lens of Embodiment 2 of the present invention satisfies all of Conditions (1) through (4) above.

TABLE 6

| Condition No. | Condition | Value |
|---|---|---|
| (1) | $0.8 < |F1|/F < 1.2$ | 0.982 |
| (2) | $1.3 < F5/F < 2.3$ | 1.876 |
| (3) | $2.0 < F(1-3)/F$ | 2.598 |
| (4) | $2.5 < F4/F < 5.5$ | 4.277 |

Figures 4A, 4B, 4C, 4D:
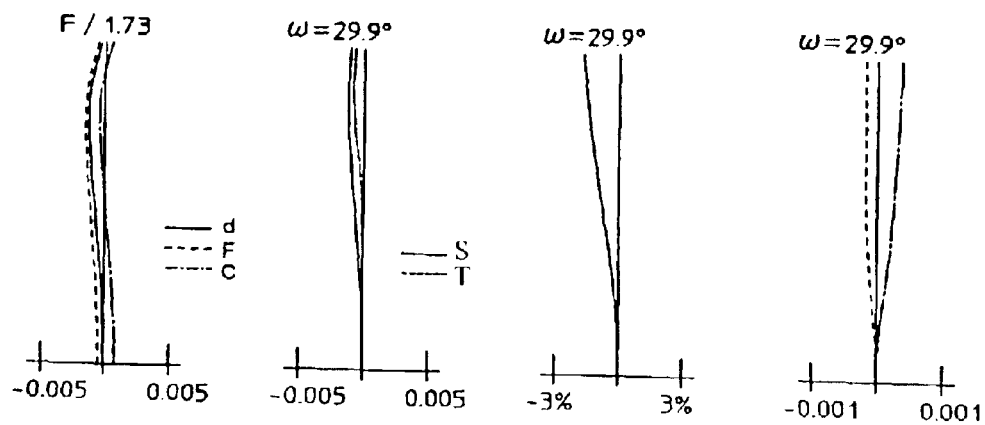
FIGS. 4A–4D show aberrations of the zoom lens of Embodiment 2 at the wide-angle end.
Figures 4E, 4F, 4G, 4H:
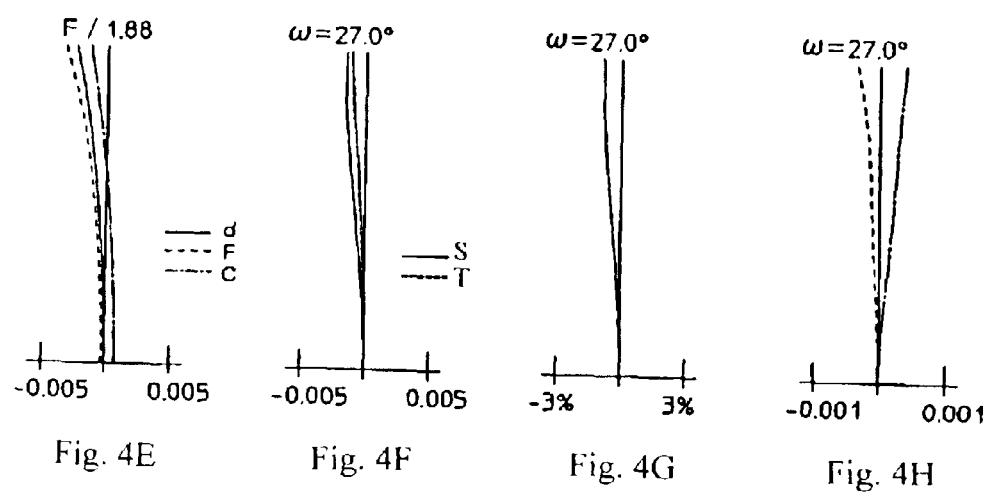
FIGS. 4E–4H show aberrations of the zoom lens of Embodiment 2 at an intermediate position.
Figures 4I, 4J, 4K, 4L:
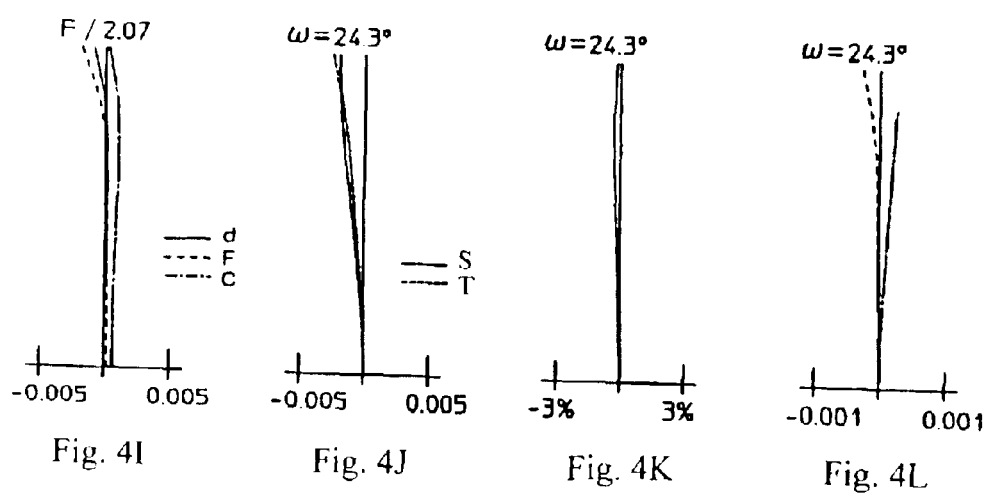
FIGS. 4I–4L show aberrations of the zoom lens of Embodiment 2 at the telephoto end.

FIGS. 4A–4D show the spherical aberration, astigmatism, distortion, and lateral color, respectively, of the zoom lens of Embodiment 2 at the wide-angle end with a zoom ratio of 1.0. FIGS. 4E–4H show the spherical aberration, astigmatism, distortion, and lateral color, respectively, of the zoom lens of Embodiment 2 at an intermediate position with a zoom ratio of 1.20, and FIGS. 4I–4L show the spherical aberration, astigmatism, distortion, and lateral color, respectively, of the zoom lens of Embodiment 2 at the telephoto end with a zoom ratio of 1.25. In FIGS. 4A, 4E, and 4I, the spherical aberration is shown for the wavelengths 587.6 nm (the d-line), 486.1 nm (the F-line), and 656.3 nm (the C-line). In the remaining figures, X is the half-image angle. In FIGS. 4B, 4F and 4J, the astigmatism is shown for both the sagittal image surface S and the tangential image surface T. In FIGS. 4C, 4G and 4K, distortion is measured at 587.6 nm (the d-line). In FIGS. 4D, 4H and 4L, the lateral color is shown for the wavelengths 486.1 nm (the F-line) and 656.3 nm (the C-line) relative to 587.6 nm (the d-line). As is apparent from these figures, the various aberrations are favorably corrected.

As is apparent from FIGS. 4A–4L, as well as in Tables 4–6, the zoom lens according to Embodiment 2 provides satisfactory aberration correction over the entire zoom range, includes a suitable back focus distance, is nearly telecentric on the reducing side, and also provides a desirable balance of features of image brightness, compactness, width of the angle of view, and zoom ratio.

Embodiment 3

FIG. 2 shows the basic lens element configuration of the zoom lens of Embodiment 3. Embodiment 3 is similar to Embodiment 1 in that lens groups $G_1$ and $G_5$ remain stationary while lens groups $G_2$, $G_3$, and $G_4$ move during zooming adjustment. Embodiment 3 differs from Embodiment 1 in its lens element configuration by different radii of curvature of lens surfaces, different optical element surface spacings, and some different indexes of refraction of the lens element materials. Additionally, Embodiment 3 differs from Embodiment 1 in that the third lens group $G_3$ includes a lens component formed of a sixth lens element $L_6$ that is a biconvex lens element with its lens surface of greater curvature on the reducing side and a seventh lens element $L_7$ that is a biconcave lens element with its lens surface of greater curvature on the enlarging side and that is cemented to the sixth lens element $L_6$.

Table 7 below lists the surface number #, in order from the enlarging side, the radius of curvature R of each surface, the on-axis surface spacing D, as well as the refractive index $N_d$ and the Abbe number $\nu_d$ (at the d-line) of each lens element for Embodiment 3. The numerical values of R and D are based on a normalized focal length of 1 at the wide-angle end configuration of the zoom lens of Embodiment 3 with the zoom lens focused at infinity. The zoom lens of Embodiment 3 provides a reducing magnification of –0.0118 at the image reducing side at the wide-angle end of the zoom lens.

TABLE 7

| # | R | D | $N_d$ | $\nu_d$ |
|---|---|---|---|---|
| 1 | 3.991 | 0.211 | 1.77250 | 49.6 |
| 2 | –253.569 | 0.007 | | |
| 3 | 2.160 | 0.082 | 1.49700 | 81.5 |
| 4 | 0.786 | 0.420 | | |
| 5 | –1.920 | 0.063 | 1.80810 | 22.8 |
| 6 | 2.140 | $D_6$(variable) | | |
| 7 | –2.055 | 0.181 | 1.83400 | 37.2 |
| 8 | –1.474 | 0.007 | | |
| 9 | 2.193 | 0.213 | 1.84666 | 23.8 |
| 10 | –5.103 | $D_{10}$(variable) | | |
| 11 | 7.502 | 0.176 | 1.58913 | 61.1 |
| 12 | –1.220 | 0.061 | 1.53172 | 48.8 |
| 13 | 26.690 | $D_{13}$(variable) | | |
| 14 | 12.626 | 0.137 | 1.58913 | 61.1 |
| 15 | –2.224 | $D_{15}$(variable) | | |

TABLE 7-continued

| # | R | D | $N_d$ | $\nu_d$ |
|---|---|---|---|---|
| 16 | 1.422 | 0.043 | 1.84666 | 23.8 |
| 17 | 0.949 | 0.238 | | |
| 18 | –0.699 | 0.054 | 1.84666 | 23.8 |
| 19 | 2.214 | 0.332 | 1.62041 | 60.3 |
| 20 | –1.055 | 0.007 | | |
| 21 | 7.520 | 0.328 | 1.69680 | 55.5 |
| 22 | –1.531 | 0.007 | | |
| 23 | 3.554 | 0.231 | 1.80518 | 25.4 |
| 24 | –6.081 | 0.487 | | |
| 25 | ∞ | 1.298 | 1.51680 | 64.2 |
| 26 | ∞ | | | |

In the zoom lens of Embodiment 3, lens groups $G_2$, $G_3$, and $G_4$ move to vary the separations of the five lens groups during zooming. Therefore, the values of the on-axis spacings $D_6$, $D_{10}$, $D_{13}$ and $D_{15}$ vary.

Table 8 below lists the values of the variables $D_6$, $D_{10}$, $D_{13}$, and $D_{15}$ (i.e., the group spacings) at zoom ratios of 1.00, 1.10, and 1.23.

TABLE 8

| Zoom ratio | $D_6$ | $D_{10}$ | $D_{13}$ | $D_{15}$ |
|---|---|---|---|---|
| 1.00 | 0.376 | 0.775 | 0.185 | 0.037 |
| 1.10 | 0.312 | 0.340 | 0.615 | 0.106 |
| 1.23 | 0.214 | 0.336 | 0.445 | 0.378 |

As set forth in Table 9 below, the zoom lens of Embodiment 3 of the present invention satisfies all of Conditions (1) through (4) above.

TABLE 9

| Condition No. | Condition | Value |
|---|---|---|
| (1) | 0.8 < |F1|/F < 1.2 | 0.989 |
| (2) | 1.3 < F5/F < 2.3 | 1.692 |
| (3) | 2.0 < F(1–3)/F | 2.940 |
| (4) | 2.5 < F4/F < 5.5 | 3.221 |

FIGS. 5A–5D show the spherical aberration, astigmatism, distortion, and lateral color, respectively, of the zoom lens of Embodiment 3 at the wide-angle end with a zoom ratio of 1.0. FIGS. 5E–5H show the spherical aberration, astigmatism, distortion, and lateral color, respectively, of the zoom lens of Embodiment 3 at an intermediate position with a zoom ratio of 1.10, and FIGS. 5I–5L show the spherical aberration, astigmatism, distortion, and lateral color, respectively, of the zoom lens of Embodiment 3 at the telephoto end with a zoom ratio of 1.23. In FIGS. 5A, 5E, and 5I, the spherical aberration is shown for the wavelengths 587.6 nm (the d-line), 486.1 nm (the F-line), and 656.3 nm (the C-line). In the remaining figures, ω is the half-image angle. In FIGS. 5B, 5F and 5J, the astigmatism is shown for both the sagittal image surface S and the tangential image surface T. In FIGS. 5C, 5G and 5K, distortion is measured at 587.6 nm (the d-line). In FIGS. 5D, 5H and 5L, the lateral color is shown for the wavelengths 486.1 nm (the F-line) and 656.3 nm (the C-line) relative to 587.6 nm (the d-line). As is apparent from these figures, the various aberrations are favorably corrected.

As is apparent from FIGS. 5A–5L, as well as in Tables 7–9, the zoom lens according to Embodiment 3 provides satisfactory aberration correction over the entire zoom range, includes a suitable back focus distance, is nearly telecentric on the reducing side, and also provides a desirable balance of features of image brightness, compactness, width of the angle of view, and zoom ratio.

Figure 6:
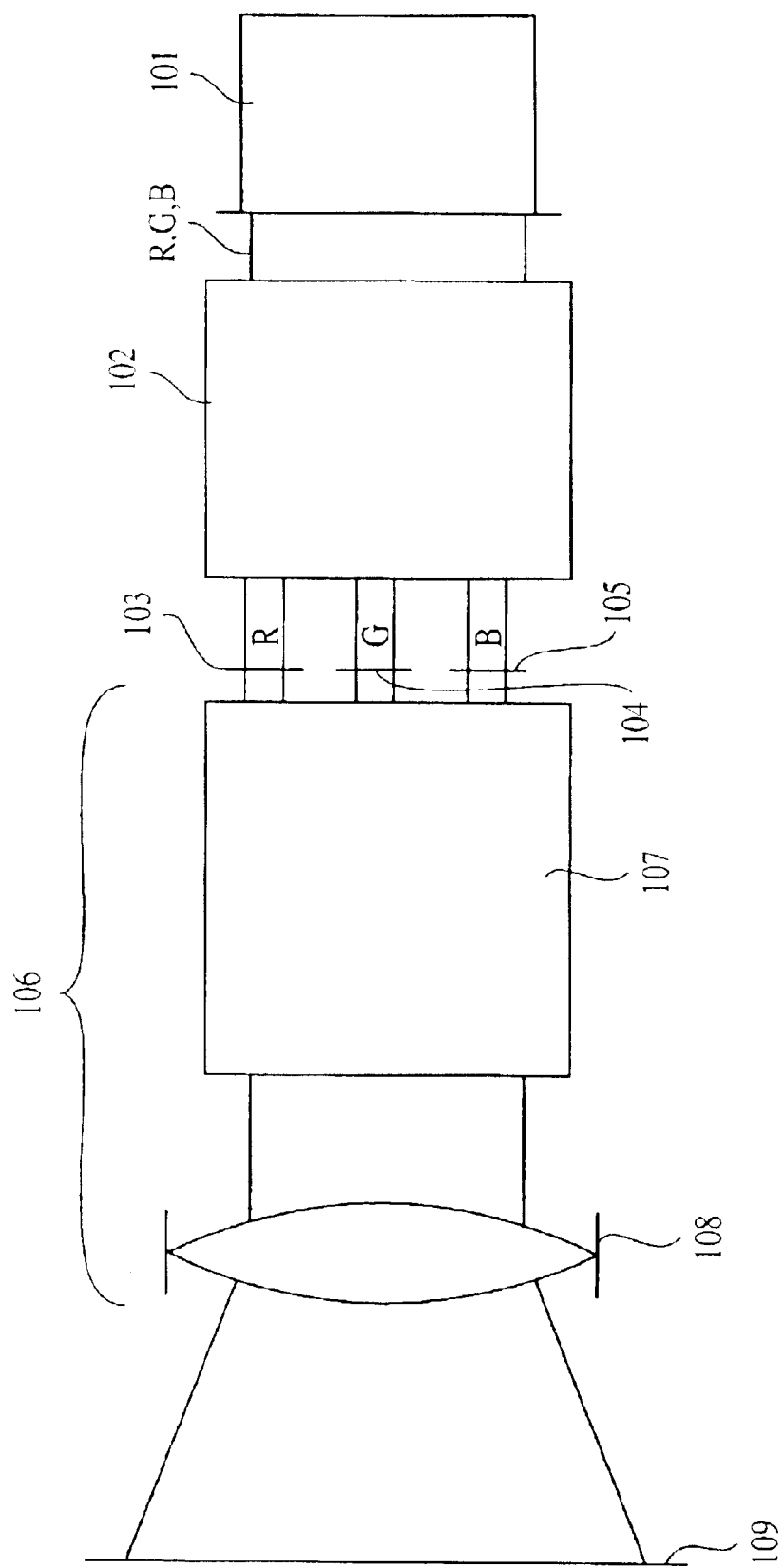
FIG. 6 shows a schematic representation of a projection display device in which a zoom lens of the present invention may be used.

An example of a projection display device in which a zoom lens of the present invention may be used is shown schematically in FIG. 6. As shown in FIG. 6, the projection display device includes a light source 101 that projects collimated light to a color separation optical system 102 that divides the light into red (R), blue (B), and green (G) light beams. The red, blue, and green light beams are separately modulated by modulators, such as transmission-type liquid crystal display elements 103, 104, and 105, that modulate the light in order to provide image information of different colors and are transmitted to a zoom projection lens 106 of the present invention. The zoom projection lens 106 includes a color synthesizing optical system 107 that combines the modulated red, blue, and green light beams into a single colored light beam for focusing by a zooming lens portion 108 that projects the combined color modulated light beam onto a screen 109. The color separation optical system 102 may include a dichroic prism and a lens array and the color synthesizing optical system may also be a dichroic prism.

The present invention is not limited to the aforementioned embodiments, as it will be obvious that various alternative implementations are possible. For instance, the number of lens elements and lens components in each lens group may be varied. Additionally, values such as the radius of curvature R of each of the lens elements and components, the surface spacings D, the refractive index $N_d$, as well as the Abbe number $v_d$, are not limited to the examples indicated in each of the aforementioned embodiments, as other values can be adopted. Furthermore, the zoom lens according to the present invention is not limited to the form used as the projection lens of a projection display device that uses a reflection-type or a transmission-type of liquid crystal display panel but may be used as a projection lens for devices that use other light modulation means, such as DMD's. Additionally, the zoom lens of the present invention may be used as an image forming lens in a camera, such as a camera using a camera tube, a CCD, or photographic film. Such variations are not to be regarded as a departure from the spirit and scope of the invention. Rather, the scope of the invention shall be defined as set forth in the following claims and their legal equivalents. All such modifications as would be obvious to one skilled in the art are intended to be included within the scope of the following claims.

What is claimed is:

1. A zoom lens for enlarging an image comprising, in order from the enlarging side to a reducing side without any intervening lens element:

a first lens group having negative refractive power that is movable for focusing and that is stationary during zooming;

a second lens group having positive refractive power that moves during zooming;

a third lens group having positive refractive power that moves during zooming;

a fourth lens group having positive refractive power that moves during zooming; and a fifth lens group having positive refractive power that is stationary during zooming;

wherein said second lens group, said third lens group, and said fourth lens group move relative to one another along the optical axis of the zoom lens during zooming.

2. The zoom lens of claim 1, wherein the following condition is satisfied:

$$0.8 < |F1|/F < 1.2$$

where

F1 is the focal length of said first lens group, and

F is the focal length of the zoom lens at the wide-angle end when the zoom lens is focused at infinity on the enlarging side.

3. The zoom lens of claim 1, wherein the following condition is satisfied:

$$1.3 < F5/F < 2.3$$

where

F5 is the focal length of said fifth lens group, and

F is the focal length of the zoom lens at the wide-angle end when the zoom lens is focused at infinity on the enlarging side.

4. The zoom lens of claim 1, wherein the following condition is satisfied:

$$2.0 < F(1-3)/F$$

where

F(1–3) is the composite focal length of said first lens group, said second lens group, and said third lens group at the wide-angle end when the zoom lens is focused at infinity on the enlarging side, and F is the focal length of the zoom lens at the wide-angle end when the zoom lens is focused at infinity on the enlarging side.

5. The zoom lens of claim 2, wherein the following condition is satisfied:

$$1.3 < F5/F < 2.3$$

where

F5 is the focal length of said fifth lens group.

6. The zoom lens of claim 5, wherein the following condition is satisfied:

$$2.0 < F(1-3)/F$$

where

F(1–3) is the composite focal length of said first lens group, said second lens group, and said third lens group at the wide-angle end when the zoom lens is focused at infinity on the enlarging side.

7. The zoom lens of claim 3, wherein the following condition is satisfied:

$$2.0 < F(1-3)/F$$

where

F(1–3) is the composite focal length of said first lens group, said second lens group, and said third lens group at the wide-angle end when the zoom lens is focused at infinity on the enlarging side.

8. The zoom lens of claim 1, wherein each of said second, third, and fourth lens groups is nearer the enlarging side of the zoom lens at the telephoto end than at the wide-angle end of the zooming range.

9. The zoom lens of claim 6, wherein each of said second, third, and fourth lens groups is nearer the enlarging side of the zoom lens at the telephoto end than at the wide-angle end of the zooming range.

10. The zoom lens of claim 6, wherein the following condition is satisfied:

$$2.5 < F4/F < 5.5$$

where

F4 is the focal length of said fourth lens group.

11. The zoom lens of claim 8, wherein the following condition is satisfied:

2.5<F4/F<5.5 where
F4 is the focal length of said fourth lens group; and
F is the focal length of the zoom lens at the wide-angle end when the zoom lens is focused at infinity on the enlarging side.

12. The zoom lens of claim 9, wherein the following condition is satisfied:

2.5<F4/F<5.5 where
F4 is the focal length of said fourth lens group.

13. The zoom lens of claim 1, wherein said fourth lens group consists of a single positive lens component.

14. The zoom lens of claim 6, wherein said fourth lens group consists of a single positive lens component.

15. The zoom lens of claim 13, wherein said single positive lens component is a biconvex lens component.

16. The zoom lens of claim 14, wherein said single positive lens component is a biconvex lens component.

17. A projection display device comprising:
the zoom lens of claim 1;
a light source on the reducing side of the zoom lens; and
a light modulator positioned between the light source and the zoom lens for modulating light from the light source with image information;
wherein
the zoom lens projects the modulated light so as to form an enlarged image on the enlarging side of the zoom lens.

18. A projection display device comprising:
the zoom lens of claim 6;
a light source on the reducing side of the zoom lens; and
a light modulator positioned between the light source and the zoom lens for modulating light from the light source with image information;
wherein
the zoom lens projects the modulated light so as to form an enlarged image on the enlarging side of the zoom lens.

19. A zoom lens for enlarging an image comprising, in order from the enlarging side to a reducing side and with no intervening lens elements:
a first lens group having negative refractive power that is movable for focusing and that is stationary during zooming;
a second lens group having positive refractive power that moves during zooming;
a third lens group having positive refractive power that moves during zooming;
a fourth lens group having positive refractive power that moves during zooming; and
a fifth lens group having positive refractive power that is stationary during zooming;
wherein
said second lens group, said third lens group, and said fourth lens group move relative to one another along the optical axis of the zoom lens during zooming.

20. A zoom lens for enlarging an image consisting of, in order from the enlarging side to a reducing side:
a first lens group having negative refractive power that is movable for focusing and that is stationary during zooming;
a second lens group having positive refractive power that moves during zooming;
a third lens group having positive refractive power that moves during zooming;
a fourth lens group having positive refractive power that moves during zooming; and
a fifth lens group having positive refractive power that is stationary during zooming;
wherein
said second lens group, said third lens group, and said fourth lens group move relative to one another along the optical axis of the zoom lens during zooming.

21. A zoom lens for enlarging an image comprising, in order from the enlarging side to a reducing side:
a first lens group having negative refractive power that is movable for focusing and that is stationary during zooming;
a second lens group having positive refractive power that moves during zooming;
a third lens group having positive refractive power that moves during zooming;
a fourth lens group having positive refractive power that moves during zooming; and
a fifth lens group having positive refractive power that is stationary during zooming;
wherein
said second lens group, said third lens group, and said fourth lens group move relative to one another along the optical axis of the zoom lens during zooming; and
said fourth lens group consists of a single positive lens component.

22. The zoom lens according to claim 21, wherein said single positive lens component is a biconvex lens component.

23. A zoom lens for enlarging an image comprising, in order from the enlarging side to a reducing side:
a first lens group having negative refractive power that is movable for focusing and that is stationary during zooming;
a second lens group having positive refractive power that moves during zooming;
a third lens group having positive refractive power that moves during zooming;
a fourth lens group having positive refractive power that moves during zooming; and
a fifth lens group having positive refractive power that is stationary during zooming;
wherein
said second lens group, said third lens group, and said fourth lens group move relative to one another along the optical axis of the zoom lens during zooming;
said fourth lens group consists of a single positive lens component; and
the following conditions are satisfied:

0.8<|F1|/F<1.2

1.3<F5/F<2.3 and 2.0<F(1–3)/F where
F1 is the focal length of said first lens group,
F is the focal length of the zoom lens at the wide-angle end when the zoom lens is focused at infinity on the enlarging side, F5 is the focal length of said fifth lens group, and F(1–3) is the composite focal length of said first lens group, said second lens group, and said third lens group at the wide-angle end when the zoom lens is focused at infinity on the enlarging side.

24. The zoom lens according to claim 23, wherein said single positive lens component is a biconvex lens component.

* * * * *

UNITED STATES PATENT AND TRADEMARK OFFICE
CERTIFICATE OF CORRECTION

PATENT NO. : 6,809,877 B2
DATED : October 26, 2004
INVENTOR(S) : Nagahara

Page 1 of 1

It is certified that error appears in the above-identified patent and that said Letters Patent is hereby corrected as shown below:

Column 1,
Line 56, change "uses" to -- use --;

Column 3,
Line 51, change "(lens element L, as" to -- (lens element $L_g$, as --;

Column 4,
Line 46, change "third lens $G_3$." to -- third lens group $G_3$ --;

Column 6,
Line 29, change "-0.01 18" to -- -0.0118 --; and

Column 9,
Line 7, change "X is the half-image" to -- $\omega$ is the half-image --.

Signed and Sealed this

First Day of February, 2005

JON W. DUDAS
*Director of the United States Patent and Trademark Office*

UNITED STATES PATENT AND TRADEMARK OFFICE
CERTIFICATE OF CORRECTION

PATENT NO.    : 6,809,877 B2  Page 1 of 1
DATED         : October 26, 2004
INVENTOR(S)   : Nagahara It is certified that error appears in the above-identified patent and that said Letters Patent is hereby corrected as shown below:

Column 1,
Line 56, change "uses" to -- use --;

Column 3,
Line 51, change "(lens element L, as" to -- (lens element $L_8$, as --;

Column 4,
Line 46, change "third lens $G_3$." to -- third lens group $G_3$ --;

Column 6,
Line 29, change "-0.01 18" to -- -0.0118 --; and

Column 9,
Line 7, change "X is the half-image" to -- ω is the half-image --.

This certificate supersedes Certificate of Correction issued February 1, 2006.

Signed and Sealed this

Twenty-first Day of March, 2006

JON W. DUDAS
*Director of the United States Patent and Trademark Office*